Patented Dec. 21, 1937

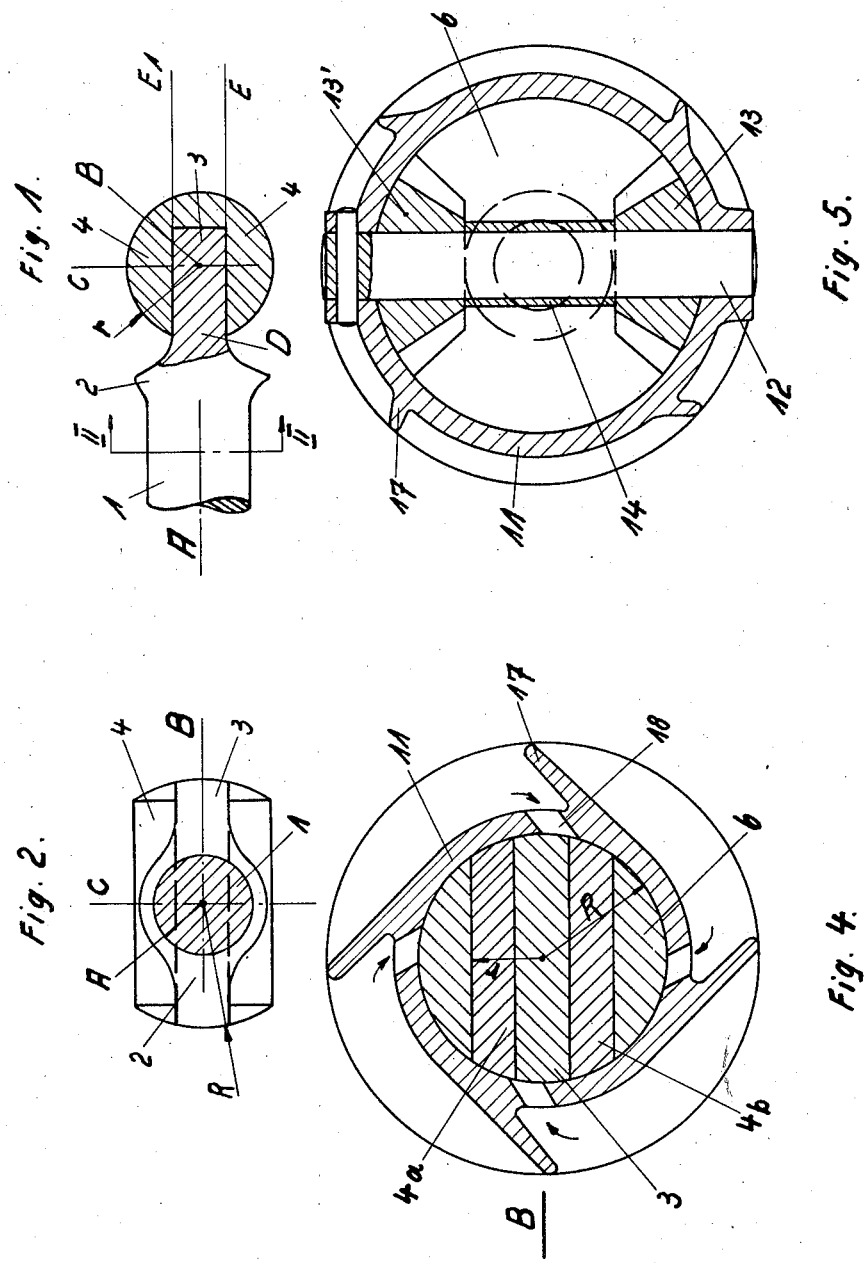

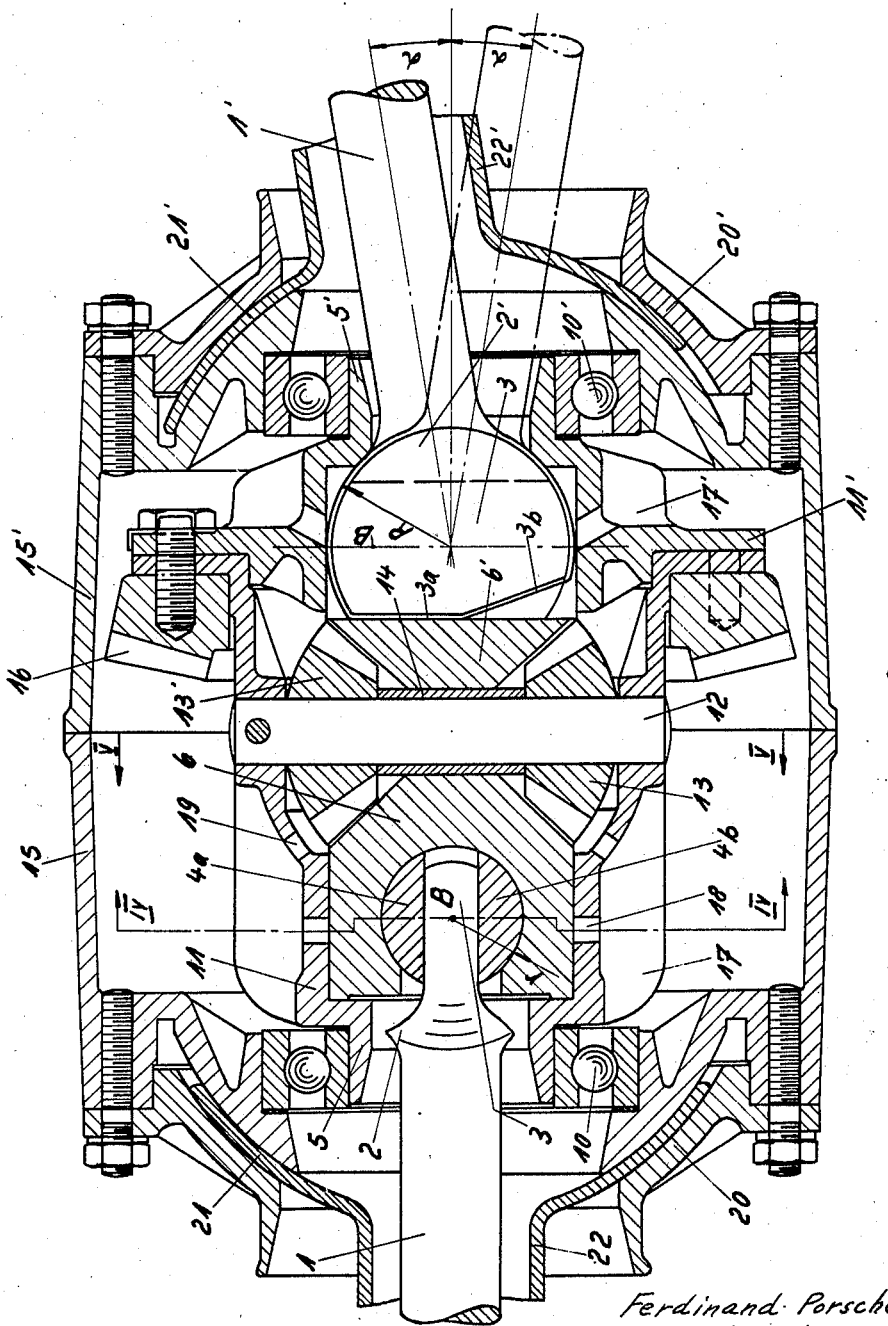

2,102,973

UNITED STATES PATENT OFFICE 2,102,973

UNIVERSAL JOINT

Ferdinand Porsche, Stuttgart, Germany

Application April 3, 1936, Serial No. 72,473
In Germany November 2, 1934

9 Claims. (Cl. 74—311)

This invention relates to improvements in universal joints and particularly to such joints especially adapted for use in motor vehicles.

The present invention is in some respects an improvement upon applicant's prior Patent No. 1,996,688, granted April 2, 1935. Whereas the joint of said patent has numerous advantages including great rigidity, the manufacture thereof presents difficulties and is therefore rather expensive.

It is an object of the present invention to overcome the said difficulties and to provide an improved joint which can be accurately manufactured at a low cost.

Another object is to provide such a joint in which a shaft member is formed with a flattened end portion preferably having parallel faces adapted for rotatable sliding movement in a bolt member which is itself mounted for rotation in a third member upon an axis at right angles to the axis of rotation of the shaft relative to the bolt.

A further object is the arrangement of a plurality of such joints in a convenient manner as parts of a differential mechanism.

The invention will be more clearly understood from the following description taken in connection with the illustrative embodiment of the invention shown in the attached drawings, wherein:

Fig. 1 is a vertical cross-sectional view of the parts of such a universal joint;

Fig. 2 is the corresponding section taken along the line II—II of Fig. 1;

Fig. 3 is a vertical section through a differential mechanism for use with swingable half axles (i. e. independently sprung power road wheels) utilizing such universal joints;

Fig. 4 is a cross-section on the line IV—IV of Fig. 3; and

Fig. 5 is a cross-section along the line V—V of Fig. 3.

Referring for the present to Figs. 1 and 2, the numeral 1 indicates a power transmitting shaft which is formed with a flattened parallel sided extension 3, the surfaces of which preferably lie within the parallel planes E and E1 respectively, which planes are parallel to the axis A of shaft 1 and to the axis B of bolt 4. Adjacent the portion 3 the shaft may preferably be formed with an enlarged section 2 for a purpose to be referred to later. The bolt 4 of the radius r is shown as provided with a recess within which the flattened portion 3 is located. If viewed at right angles to Fig. 1, the flat on the shaft may appear as shown in the right hand portion of Fig. 3. The ends of the bolt 4 as well as the edges of the flat 3 are preferably generated spherically about the intersection of the axes A, B, and C. The shaft extension 2 is preferably also formed spherically with respect to the radius R. The bolt 4 is mounted in a transverse bore extending generally through a power transmitting block such as 6 (Fig. 3) within which it is free to oscillate through a limited angle.

Upon the occurence of angular deflection in the plane A, C, the bolt 4 together with the flat 3 of the shaft are oscillated together within the block 6. Upon angular deflection in the plane A, B, the flat 3 is shifted within the bolt 4, the bearing surfaces in this case being the planes E, E1. Since angular deflections may consist of both such movements, the deflection of the shaft 1 may always take place about the intersection of the axes A, B, and C.

In Fig. 3, two of these simple joints are combined in a convenient manner in a differential mechanism suitable for the differential transmission of power to independently sprung power road wheels. In the joints there shown the bolt 4 instead of being made as one piece is divided and is shown as made of two cylindrical segments 4a and 4b, the flat faces of which bear upon the flat 3 of the shaft 1. The bolt axes B are here shown as arranged 90° apart. It will be noted that in order to permit a certain angular deflection the flat plate 3 is provided with cylindrical beveled portions 3a and 3b. The plate 3 is oscillatably mounted between the edges 4a, 4b, of the bolt 4 which, in turn, is mounted in a bore extending all the way through the power transmitting block 6, 6', which, in this case, is an integral part of the differential gear. The differential gears 6, 6' are rotatably but not shiftably arranged in the differential housing 11. The driving shafts 1, 1' are thus joined through said universal joints with the differential gears 6, 6'. The differential gears 6, 6' are constantly in mesh with two or more beveled pinions 13, 13' journaled upon the bolt 12 carried by the differential housing 11.

A sleeve 14 is shown as mounted upon the bolt 12 and serving to space the pinions 13, 13'. This sleeve is shown as also serving as an abutment for the differential gears 6, 6'. The differential housing 11 is journaled rotatably in the two part axle housing 15, 15' by means of carrying flanges 5, 5' and the ball bearings 16, 16'. The differential housing 11 and its lid 11' are shown connected together by means of bolts which also hold in place the ring gear 16.

The differential housing 11 as well as its cover 11' are shown provided with ribs or vanes 17, 17' which serve as oil scoops. From the bottom of these vanes, channels 18, 18' lead to the bearing surfaces of the differential gears 6, 6'. Furthermore, bored holes 19 lead to the interengaging surfaces of the beveled pinions 13, 13' and the ring gear 16.

The spherically shaped enlarged ends 21, 21' of the axle tubes 22, 22' are mounted for angular movement between the axle housing 15, 15' and the covers 20, 21' thereof, thus providing a dirt-proof oil-tight joint which permits angular deflections of the axle tubes.

The forms of the invention shown and described above are, of course, to be taken merely as illustrative and not as limiting since various changes may be made without departing from the invention. For example, the flat extension 3 on the shaft 1 may be wedge shaped if desired. Furthermore, instead of flat co-acting surfaces between the shaft and the bolt, these may interengage as by tongue and groove arranged concentrically with the outer edge of the portion 3, in which event, the flanges 2 on the shafts may be omitted. Instead of the beveled surfaces 3a, 3b, a spherical extension of the shaft plate 3 may be used. In this case, end thrust would be taken up by this extension in cooperation with the flange 2.

The constructions described are advantageously used for connecting parts which must sustain heavy loads but where the size must be kept as small as possible but as, for example, in driving elements in motor vehicles.

What is claimed is:

1. A universal joint comprising a rotatable member formed with an extension having flat parallel surfaces parallel to the axis of rotation of said member, a second member formed with flat parallel surfaces engaging the flat parallel surfaces of said first member and formed with a cylindrical surface the axis of which is parallel to said flat surfaces, and a third member formed with a transverse bore for embracing the cylindrical surface of said second member, and means on said rotatable member including means cooperating with said third member for preventing axial movement of said rotatable member.

2. In a universal joint for differential mechanisms of motor vehicles, a rotatable axle shaft formed with an extension having flat parallel surfaces parallel to the axis of said shaft, a second member formed with flat parallel surfaces engaging the flat parallel surfaces of said first member and formed with a cylindrical exterior surface the axis of which is parallel to said flat surfaces, a differential housing, a ring gear mounted thereon, and bevel pinions carried for revolution therewith, and a bevel gear constantly in mesh with said pinions, said bevel gear being formed with a transverse bore for embracing the cylindrical exterior surface of said second member, and having a cylindrical portion journaled within an internal annular portion of said differential housing, the ends of said second member being formed spherically so as to cooperate with said annular portion of said differential housing.

3. A universal joint according to claim 2 wherein the edges of the extension on the first member also are formed spherically about a center, common with the ends of said second member, whereby said edges cooperate with the annular portion of said differential housing.

4. A universal joint according to claim 2 wherein the second member is formed of cylindrical segments.

5. In a power transmitting device, in combination, an axle housing capable of retaining oil, a differential housing rotatably mounted in said axle housing, a ring gear mounted on said differential housing and adapted to be driven by suitable driving means, a differential gear mechanism mounted for relative rotation within said differential housing including a universal joint comprising a rotatable member formed with an extension having flat parallel surfaces parallel to the axis of rotation of said member, a second member formed with flat parallel faces engaging the flat parallel surfaces of said first member and formed with a cylindrical surface the axis of which is parallel to said flat surfaces, and a third member formed with a transverse bore for embracing the cylindrical surface of said second member, and means on said differential housing for insuring a proper supply of lubricant to said differential gear mechanism.

6. In a power transmitting device, in combination, an axle housing capable of retaining oil, a differential housing rotatably mounted therein, a ring gear mounted on said differential housing and adapted to be driven by suitable driving means, a differential gear mechanism mounted for relative rotation within said differential housing including a universal joint comprising a rotatable member formed with an extension having flat parallel surfaces parallel to the axis of rotation of said member, a second member formed with flat parallel faces engaging the flat parallel surfaces of said first member and formed with a cylindrical surface the axis of which is parallel to said flat surfaces, and a third member formed with a transverse bore for embracing the cylindrical surface of said second member, and means on said rotatable member including means cooperating with said third member for preventing axial movement of said rotatable member, and means on said differential housing for insuring a proper supply of lubricant to said differential gear mechanism.

7. The combination according to claim 6 in which said last cooperating means comprises a pair of surfaces inclined to one another and alternatively contacting said third member.

8. In a power transmitting device, in combination, an axle housing, a differential housing rotatably mounted therein, a ring gear mounted on said differential housing and adapted to be driven by suitable driving means, a differential gear mechanism mounted for relative rotation within said differential housing including a rotatable shaft formed with an extension having flat parallel surfaces parallel to the axis of said shaft, a second member formed with flat parallel surfaces engaging the flat parallel surfaces of said first member and formed with a cylindrical exterior surface the axis of which is parallel to said flat surface, beveled pinions carried for revolution with said differential housing, and a bevel gear constantly in mesh with said pinions, said beveled gear being formed with a transverse bore for embracing the cylindrical exterior surface of said second member, and having a cylindrical portion journaled within an annular portion of said differential housing, the ends of said second member being formed spherically so as to cooperate with the annular portion of said differential housing.

9. The combination according to claim 8 wherein the edges of the extension on the first member are also formed sphericaly about a center common with the ends of said second member, whereby said edges cooperate with the annular portion of said differential housing.

FERDINAND PORSCHE.